United States Patent [19]

Tanaka et al.

[11] Patent Number: 4,475,935
[45] Date of Patent: Oct. 9, 1984

[54] JOINING METHOD TO OBTAIN ELONGATED COATED OPTICAL FIBER

[75] Inventors: Chihaya Tanaka; Kazuo Iwabuchi, both of Ibaraki; Toshiaki Kakii; Yuichi Toda, both of Kanagawa, all of Japan

[73] Assignees: Nippon Telegraph & Telephone Public Corporation, Tokyo; Sumitomo Electric Industries, Ltd., Osaka, both of Japan

[21] Appl. No.: 401,044

[22] Filed: Jul. 22, 1982

[30] Foreign Application Priority Data

Jul. 24, 1981 [JP] Japan .................... 56-116056

[51] Int. Cl.$^3$ .................................. C03B 37/12
[52] U.S. Cl. ....................... 65/3.41; 65/3.43; 65/4.21; 65/31
[58] Field of Search ............ 65/3.41, 3.43, 3.44, 65/4.21, 31; 156/158, 159; 427/163

[56] References Cited

U.S. PATENT DOCUMENTS

3,960,531  6/1976  Kohanzadeh et al. ............ 65/4.21
3,982,917  9/1976  Upton ................................ 65/31

FOREIGN PATENT DOCUMENTS

54-06562  1/1979  Japan .................... 65/3.41
54-13352  1/1979  Japan .................... 65/3.41
54-39648  3/1979  Japan .................... 65/3.41
56-17306  2/1981  Japan .................... 65/3.41

Primary Examiner—S. Leon Bashore
Assistant Examiner—Michael K. Boyer
Attorney, Agent, or Firm—Sughrue, Mion, Zinn, Macpeak & Seas

[57] ABSTRACT

A method for producing an elongated optical fiber element is disclosed. The method envolves preparing two optical fiber elements by removing their outer coating layers to expose bare glass fiber portions. The glass fiber portions are melt-joint together. A material which is chemically compatible with the removed outered layer is then molded about the joined bare glass portions. A thermoplastic resin is then extruded continuously over the molded material in order to form a single elongated optical fiber element. The bonding method produces a structure which can withstand bending stress exerted on the coated optical fiber and prevent the concentration of any stress in the bonded area.

10 Claims, 10 Drawing Figures

JOINING METHOD TO OBTAIN ELONGATED COATED OPTICAL FIBER

FIELD OF THE INVENTION

The present invention relates to a process for the production of long coated optical fibers. More particularly the invention relates to a method of splicing optical fibers.

BACKGROUND OF THE INVENTION

In producing long coated optical fibers, care must be taken to ensure that the coated optical fiber or buffered optical fiber is not broken during the production thereof. The glass fibers are comprised of glass material which is broken by fine failures or cracks formed therein. Accordingly, when producing long coated optical fibers it is desirable to prevent such fine failures or cracks from developing in the glass over an extended length.

To eliminate this problem there has been proposed a method in which coated optical fibers having a predetermined length are first produced in place of a long coated optical fiber. Thereafter, the fibers are spliced to each other and mold-reinforced at the spliced parts to provide a long optical fiber.

As shown in FIG. 1, a coated optical fiber 1 has a two layer-coated structure. More specifically the coated fiber is comprised of a bare glass fiber 2 covered with a primary coating 3 (e.g., silicone). The coating 3 provides protection, reinforcement, and so forth of bare glass fiber 2 providing a buffered optical fibers 4. Furthermore, the buffered optical fiber 4 is covered with a secondary coating 5 (e.g., nylon).

When bare glass fibers 2—2 are exposed and spliced to each other and, thereafter, are molded at the spliced part by the above-described method, the mold reproduced-part 6 has a single layer-coated structure. Problems result when the long coated optical fiber is bent, in that the bending stress is concentrated at the molded boundary to a change in Young's modulus resulting from the difference in structure. Moreover, when the spliced part is subjected to a surface treatment using, for example, hydrofluoric acid for the purpose of improving the strength thereof, the hydrofluoric acid penetrates to the area between the coated optical fiber 1 and buffered optical fiber 4. When this happens it is necessary to remove the hydrofluoric acid, and if the hydrofluoric acid is insufficiently removed and remains in the inside, it causes a reduction in the strength of the coated optical fiber. Therefore, the long coated optical fiber produced by the above-described method is inferior with respect to reliability over a long period of time.

SUMMARY OF THE INVENTION

An object of the invention is to overcome the above-described defects of the conventional method of producing a long coated optical fiber by splicing short coated optical fibers to each other.

The present invention, therefore, provides a process for the production of a long coated optical fiber, ensuring that the spliced part has structure and strength which are similar to those of the remainder of the coated fiber.

DETAILED DESCRIPTION OF THE INVENTION

Throughout the specification, "bare glass fiber" means a glass fiber without any coating, "buffered optical fiber or element" means the fiber coated with a first or primary coating (reinforcing layer), and "coated optical fiber" means the fiber coated with first (reinforcing) and second (protection) layers.

A typical type of optical fiber includes an optical transmission glass line mainly composed of silica or quartz glass, a first coating made of silicone resin provided by coating and baking the same onto the glass line, and a second coating made of nylon formed over the first coating by extrusion.

One embodiment of the process of the invention comprises the steps of (a) peeling a coating of a buffered optical fiber at one end thereof to expose a bare glass fiber; (b) melt-splicing the thus-exposed bare glass fiber to another bare glass fiber which has been exposed in the same manner as above; (c) molding a resin capable of combining together with the coating of the buffered optical fiber into one body, around the bare glass fibers at the connected part in such a manner that the diameter of the resulting line is equal to that of the buffered optical fiber; and (d) providing an additional coating on the continuous buffered optical fiber to produce a long coated optical fiber.

In another embodiment, the process of the invention comprises the steps of: (a) peeling a coating of a coated optical fiber at one end thereof to expose a buffered optical fiber; (b) further peeling a coating of the buffered optical fiber to expose a bare glass fiber; (c) melt-splicing the thus-exposed bare glass fiber to another bare glass fiber which has been exposed in the same manner as above; (d) molding a resin capable of combining together with the coating of the buffered optical fiber into one body, around the bare glass fibers at the spliced part in such a manner that the diameter of the resulting molded line is equal to that of the buffered optical fiber; and (e) molding a resin capable of combining together with the coating of the coated optical fiber into one body, around the above-molded part in such a manner that the diameter of the resulting molded line is equal to that of the coated optical fiber to thereby produce the long coated optical fiber.

The invention will hereinafter be explained in detail with reference to the accompanying drawings.

FIGS. 2-7 indicate the steps of an embodiment of the first process of the invention.

Figure 1:
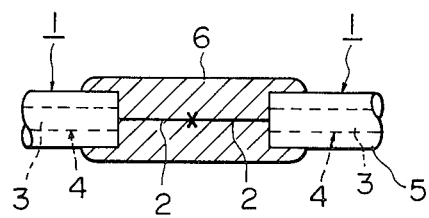
FIG. 1 is a schematic cross-sectional view of a spliced part of a long coated optical fiber produced by a conventional method.
Figure 2:
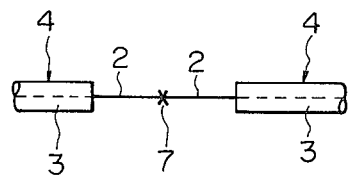
FIG. 2 is a schematic cross-sectional view of a splicing of the present method.

In the first place, as shown in FIG. 2 a primary coating 3 of a buffered optical fiber 4 is peeled from the buffered optical fiber 4 at one end thereof to expose a bare glass fiber 2. The bare glass fiber 2 thus exposed is melt-spliced to another bare glass fiber 2 which has been exposed in the same manner as above, by a melt-splicing method. In the figures, the reference numeral 7 indicates a melt-splicing point where the bare glass fibers 2—2 are melt-spliced. This point is also indicated by the symbol x for the sake of convenience.

Figure 3:
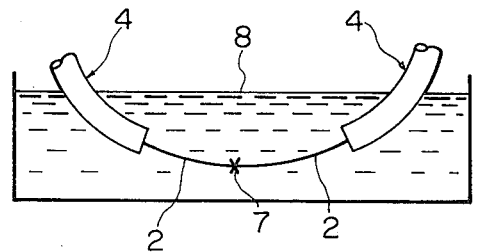
FIG. 3 is a schematic cross-sectional view of the acid dipping step of the present method.

As shown in FIG. 3 the spliced part is then etched by dipping it in a mixed acid solution 9 comprising, for example, hydrofluoric acid and sulfuric acid to thereby increase the strength thereof.

Figure 4:
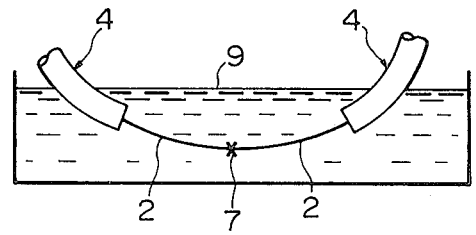
FIG. 4 is a schematic cross-sectional view of a film forming dipping step of the present method.

As shown in FIG. 4 the spliced part is then dipped in a silane coupling agent or organic silicone and indium-containing liquid 9 to thereby provide a thin film on the surface thereof for the purpose of protection and reinforcement thereof. In place of the above-prepared thin film, there is sometimes utilized a thin film which is formed when the spliced part is dipped in boiling water for a predetermined period of time.

Figure 5:
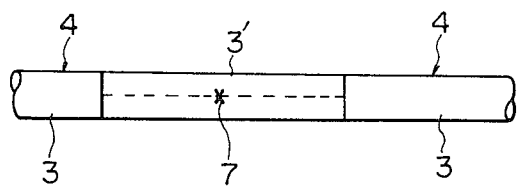
FIG. 5 is a schematic cross-sectional view of the completed molding step of the present method.

As shown in FIG. 5 the spliced part is molded with a resin, so that, around the bare glass fiber 2, the resin combines together with the coating 3 of the buffered optical fiber 4 into one body. As a result there is buffered fiber of mold-reproduced part 3' is performed by placing the spliced part in a mold and injecting a resin into the mold so that the resin reaches around the bare glass fiber 2. The resin used in the formation of the reproduced part 3', may be the same material as the coating 3 of the coated optical fiber 4 or a material of the same type used above. In this way, the coating 3 of the buffered optical fiber 4 and the buffered fiber mold-reproduced part 3' are combined together into one body.

The "same type of material" which is used for the first coating may be a material which is different from the material of the coating 3. However, the material should provide bending characteristics at the joint portion substantially the same as that of the remaining portion. Therefore, when a silicone resin is used for the joint portion, the relevent resins are epoxy resin, and polyester resin.

Figure 6:
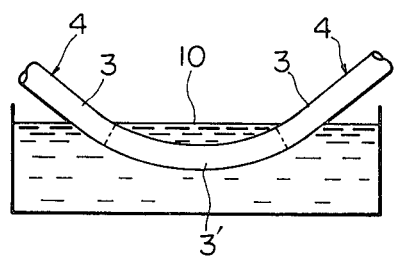
FIG. 6 is a schematic cross sectional view of a film forming step of the present method.

As shown in FIG. 6, the buffered fiber mold-reproduced part 3' is dipped in a liquid 10.

The liquid 10 may be an organic silicone or metallic indium which is used to coat thereon a thin film. The film aids in providing protection and reinforcement.

Figure 7:
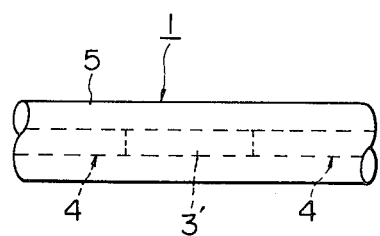
FIG. 7 is a schematic cross-sectional view of a mold reinforcement by the present method.

The above-described procedure is conducted once or repeated several times to produce a buffered optical fiber 4 having any desired length. The buffered optical fiber 4 is then, as shown in FIG. 7, provided continuously with a secondary coating 5 by extrusion, for example, to thereby produce a long coated optical fiber 1.

In addition to the above-described process steps of the invention other steps may be carried out. Furthermore, some steps may be omitted. But the step of splicing bare glass fibers 2—2, the step of molding of the buffered fiber mold-reproduced part 3', and the step of coating the spliced buffered optical fiber 4 may not be omitted.

Hereinafter, a second embodiment of the process of the invention will be explained.

In accordance with this method, coated optical fibers having a suitable length are spliced to each other to produce a long coated optical fiber.

Figure 9:
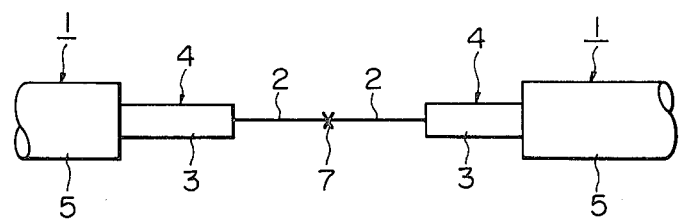
FIG. 9 is a schematic cross-sectional view of a second embodiment of the present method showing a fiber joining condition prior to the state shown in FIG. 8.

As shown in FIG. 9 a predetermined length of a secondary coating 5 is peeled from a coated optical fiber at one end thereof to expose a buffered optical fiber 4. Furthermore, a predetermined length of a primary coating 3 is peeled from the buffered optical fiber 4 to expose a bare glass fiber 2. The bare glass fiber 2 thus exposed is melt-spliced to another bare glass fiber which has been exposed in the same manner as above. Thereafter, if necessary, in the same manner as described hereinbefore, the bare glass fiber 2 at the spliced part is subjected to etching and, furthermore, coated with a thin film (see FIGS. 3 and 4).

A resin is then molded around the bare glass fiber 2 at the spliced part. The resin combines together with the coating 3 of the buffered optical fiber 4 into one body, producing a mold-reproduced part 3' having the same diameter as the buffered optical fiber 4 (see FIG. 5). In the formation of the mold-reproduced part 3', a mold is used and the same resin as the coating 3 or a resin material of the same type is used as is the case in the above-described method. Thereafter, if desired, the surface of the mold-reproduced part 3' is coated with a thin film. The film provides protection and reinforcement (see FIG. 6).

Figure 8:
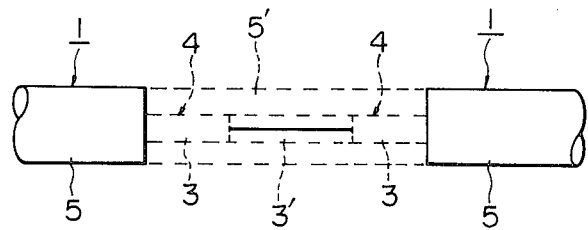
FIG. 8 is a schematic cross-sectional view of a second embodiment of the present method.

As shown in FIG. 8, a resin is then molded around the mold-reproduced part 3" at the spliced part. The resin is combined together with the coating 5 of the coated optical fiber 1 into one body, thereby producing a mold-reproduced part 5'. The formation of the mold-reproduced part 5' is performed by placing the spliced part in a mold and injecting the resin into the mold so that the resin reaches around the mold-reproduced part 3'. The injected resin is the same resin as the coating 5 or a resin material of the same type.

In this way, there can be obtained a long coated optical fiber 1 in which the spliced part has a structure and strength which are similar to those of the other parts.

In the above-described two methods, a method of coating a thick film is not limited to a dipping method as described hereinbefore. In addition, a vacuum vapor deposition method, a spraying method, a non-electrolytic plating method, etc. can be used.

The invention will now be described with reference to a specific example. However, it is to be understood that this invention is not limited to this example.

EXAMPLE

Figure 10:
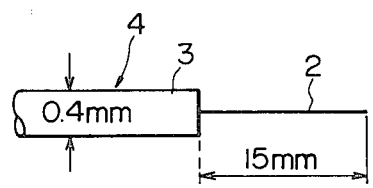
FIG. 10 is a schematic cross-sectional view of an optical fiber showing typical dimensions.

An optical fiber element coated with silicone and having a diameter of 0.4 mm was prepared. The silicone was removed by gauze impregnated with acetone. Thereafter, the fiber was cut by a fiber cutter to have an axial length of a bare fiber portion of 15 mm as shown in FIG. 10. Such fiber elements were joined together by melt joining, and thereafter, these were dipped into a hydrofluoric acid having a consistency of 10% for about five minutes as shown in FIG. 3. The joint portion is generally strong enough to hold about 500 g. However, by the dipping, the strength increases to 1500 g as a mean value, and can be increased to 3 kg at maximum value. These values were obtained for fiber having a diameter of 125 microns. It is assumed that the reason for the increased strength is due to the removal of minute cracks existing on the optical fiber surface by the hydrofluoric acid. A split mold was used to provide a silicone coating at the bare fiber portions so as to provide the same diameter as that of the fiber elements. In this case, molding accuray is determined by the diameter of the metal mold. The size of the fiber element can be molded within a range of 0.4 mm plus or minus 0.03 mm. (0.4 mm is the diameter of the fiber element) The resultant axial mold length was about 30 mm. Thereafter, such steps were repeatedly carried out along the axial direction of the fibers to provide an elongated optical fiber element. Extrusion forming was then carried out to extrude nylon over the fiber element to obtain the resultant nylon coated fiber diameter of 0.9 mm. The mean strength of the joint portion was about 1.8 kg and the minimum bending radius at breakage was 5 mm or less. Therefore, it was found that these nylon coated fiber can be available for cable bundle assembly.

In accordance with the method of the invention, as described hereinbefore, there can be obtained a long coated optical fiber in which the spliced part of the buffered optical fiber or coated optical fiber has the same structure as the other parts and has a strength of the same order as the other parts. Thus, a bending stress exerted on the coated optical fiber is prevented from being concentrated at the spliced part and its reliability is increased.

The invention has been disclosed and described herein in what is considered to be the most preferred embodiments. However, it is to be understood that modification will be apparent to those skilled in the art upon reading this disclosure.

What is claimed is:

1. A method for joining elongated optical fiber cables each of which including a glass fiber and a coating layer formed over said glass fiber, comprising the steps of:
    preparing a first optical fiber cable by removing said coating layer from an end portion of the cable to provide a first bare glass fiber portion;
    preparing a second optical fiber cable by removing said coating layer from an end portion of the cable to provide a second bare glass fiber portion;
    splicing and melt-joining said first bare glass fiber portion and second bare glass fiber portion in order to form joined bare glass fiber portions; and
    molding a material about the joined bare glass fiber portions in such a manner that the resultant molded portion has a diameter substantially equal to that of said coating layer, the material being chemically compatible with said coating layer.

2. A method as claimed in claim 1, further comprising the step of:
    exposing the bare glass fiber portions to acid treatment after the splicing and melt-joining.

3. A method as claimed in claim 2, further comprising the step of:
    forming a thin film on the bare glass fiber portions after the acid treatment by means of coating the acid treated bare glass portions with a compound selected from the group consisting of a silane coupling agent and an organic silicone.

4. A method as claimed in any of claims 1, 2 or 3, further comprising the step of:
    forming a thin film about the molded material.

5. A method as claimed in claim 1, further comprising subsequent to the step of molding the step of:
    extruding a resin to provide a continuous coating over the first and second optical fiber cables in order to provide a continuous coating over the first and second optical fiber cables.

6. A method for joining elongated optical fiber cables each of which including a glass fiber, a first coating layer formed thereover and a second coating layer formed over said first coating layer, comprising the steps of;
    preparing a first optical fiber cable by successively removing said second and first coating layers to provide a first bare glass fiber portion;
    preparing a second optical fiber cable by successively removing said second and first coating layers to provide a second bare glass fiber portion;
    splicing and melt-joining said first and second bare glass fiber portions in order to form joined bare glass fiber portions;
    molding a first material over said joined bare glass fiber portions in such a manner that the resultant molded portion has a diameter substantially equal to that of said first coating layer, said first material being chemically compatible with said first coating layer, and;
    providing a second material over at least said molded portion to form a coating, said coating having a diameter substantially equal to that of said second coating layer, and said second material being chemically compatible with said second coating layers.

7. A method as claimed in claim 6, further comprising the step of:
    exposing the bare glass fiber portions to acid treatment after the splicing and melt-joining.

8. A method as claimed in claim 7, further comprising the step of:
    forming a thin film on the bare glass fiber portions after the acid treatment by means of coating the acid treated bare glass portions with a compound selected from the group consisting of a silane coupling agent and an organic silicone.

9. A method as claimed in claims 6, 7 or 8, further comprising the step of:
    forming a thin film about the molded portion.

10. A method as claimed in claim 5, further comprising the step of:
    exposing the bare glass fiber portions to acid treatment after the splicing and melt-joining.

* * * * *